(12) United States Patent
Boyle et al.

(10) Patent No.: US 9,038,007 B2
(45) Date of Patent: *May 19, 2015

(54) PREDICTION OF DYNAMIC CURRENT WAVEFORM AND SPECTRUM IN A SEMICONDUCTOR DEVICE

(75) Inventors: Peter Boyle, Mountain View, CA (US); Iliya G. Zamek, San Jose, CA (US)

(73) Assignee: Altera Corporation, San Jose, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/365,567

(22) Filed: Feb. 3, 2012

(65) Prior Publication Data

US 2012/0198410 A1 Aug. 2, 2012

Related U.S. Application Data

(62) Division of application No. 12/268,365, filed on Nov. 10, 2008, now Pat. No. 8,132,137.

(60) Provisional application No. 60/987,039, filed on Nov. 10, 2007.

(51) Int. Cl.
*G06F 17/50* (2006.01)
*H05K 3/00* (2006.01)
*H05K 1/02* (2006.01)

(52) U.S. Cl.
CPC .......... *G06F 17/5036* (2013.01); *H05K 3/0005* (2013.01); *H05K 1/0231* (2013.01); *G06F 2217/84* (2013.01)

(58) Field of Classification Search
CPC ............ G06F 17/5036; G06F 2217/84; H05K 1/0231; H05K 3/0005
USPC .......... 716/106, 107, 108, 109, 110, 111, 120
See application file for complete search history.

(56) References Cited

U.S. PATENT DOCUMENTS

| 4,009,449 | A | * | 2/1977 | Agans | 331/16 |
| 5,132,558 | A | * | 7/1992 | Rustici | 327/93 |
| 5,729,145 | A | * | 3/1998 | Blades | 324/536 |
| 6,308,300 | B1 | | 10/2001 | Bushnell et al. | |

(Continued)

OTHER PUBLICATIONS

Chen et al., "A Spread Spectrum Clock Generator for SATA-II", 2005, Circuits and Systems, 2005, ISCAS 2005, IEEE International Symposium, pp. 2643-2646 vol. 3.

(Continued)

*Primary Examiner* — Helen Rossoshek
(74) *Attorney, Agent, or Firm* — Womble, Carlyle, Sandridge & Rice

(57) ABSTRACT

A method for accurately determining the shape of currents in a current spectrum for a circuit design is provided. The method includes determining timing and power consumption characteristics. In one embodiment, timing characteristics are provided through a electronic design automation tool. The timing characteristics yield a current pulse time width. In another embodiment, power consumption characteristics are provided by an EDA tool. The power consumption characteristics yield a current pulse amplitude. The shape of the current pulse is obtained by incrementally processing a power analyzer tool over relatively small time increments over one or more clock cycles while capturing the switching nodes of a simulation of the circuit design for each time increment. In one embodiment, the time increments are one nanosecond or less.

20 Claims, 13 Drawing Sheets

(56) References Cited

U.S. PATENT DOCUMENTS

| | | | |
|---|---|---|---|
| 6,374,392 B1* | 4/2002 | Ochiai et al. | 716/113 |
| 6,678,643 B1* | 1/2004 | Turnquist et al. | 703/14 |
| 6,762,986 B1* | 7/2004 | Seo | 369/59.12 |
| 6,977,556 B1* | 12/2005 | Petrovic et al. | 331/18 |
| 7,222,033 B1* | 5/2007 | Newson et al. | 702/65 |
| 7,312,646 B2* | 12/2007 | Jorgenson et al. | 327/170 |
| 7,408,336 B2* | 8/2008 | Birmiwal et al. | 324/76.22 |
| 7,415,594 B2* | 8/2008 | Doerr et al. | 712/15 |
| 7,583,065 B2* | 9/2009 | Xu et al. | 323/266 |
| 7,782,976 B1* | 8/2010 | Falcone | 375/295 |
| 7,809,543 B2 | 10/2010 | Chiu et al. | |
| 7,856,329 B2* | 12/2010 | Niebauer et al. | 702/66 |
| 7,882,468 B2* | 2/2011 | Harada et al. | 716/106 |
| 7,957,150 B2* | 6/2011 | Osaka et al. | 361/748 |
| 7,962,870 B2* | 6/2011 | Boyle et al. | 716/108 |
| 2002/0174409 A1* | 11/2002 | Cohn et al. | 716/6 |
| 2003/0212973 A1* | 11/2003 | Lin et al. | 716/6 |
| 2005/0225365 A1* | 10/2005 | Wood | 327/141 |
| 2008/0054914 A1* | 3/2008 | Byington et al. | 324/693 |
| 2009/0041104 A1* | 2/2009 | Bogdan | 375/226 |
| 2009/0311979 A1* | 12/2009 | Husted et al. | 455/102 |

OTHER PUBLICATIONS

McKinney et al.,"Shaping the Power Spectrum of Ultra-Wideband Radio-Frequency Signals", 2006, Microwave Theory and Techniques, IEEE Transaction, vol. 54, Issue 12, Part 1, pp. 4247-4255.

Ouzounov et al., "Sigma-Delta Modulators Operating at a Limit Cycle", 2006, Circuits and Systems II Express Briefs, IEEE Transactions, vol. 53, Issue 5, pp. 399-403.

\* cited by examiner

PREDICTION OF DYNAMIC CURRENT WAVEFORM AND SPECTRUM IN A SEMICONDUCTOR DEVICE

PRIORITY

This application is a divisional application of U.S. application Ser. No. 12/268,365, filed Nov. 10, 2008 now U.S. Pat. No. 8,132,137, which claims priority to Provisional Patent Application No. 60/987,039, filed Nov. 10, 2007, and entitled "Prediction of Dynamic Current Waveform and Spectrum in a Semiconductor Device." Both applications are herein incorporated by reference.

BACKGROUND

Semiconductors contain complex circuits which draw significant current during use. Direct current (DC) components of the current are relatively simple to predict and account for. However, alternating current (AC) components have frequency content which must be carefully accounted for in a power distribution network design on a die, package, and printed circuit board. Traditional techniques utilize a broadband frequency compensation, which adds cost and complexity to designs. Printed circuit board manufacturers will typically need to understand how much current will be drawn when a chip is in use in order to design an optimal printed circuit board. The data will determine an amount and a location for decoupling capacitors over this printed circuit board in order to ensure the chip can operate without interference. As chip manufacturers do not have the proper tools or resources to provide a detailed analysis for the printed circuit board manufacturers, the chip manufacturers tend to over-recommend to cover a worst-case situation. This over recommendation is typically ignored by the printed circuit board manufacturers since the over recommendation would cost too much for the printed circuit board manufacturers to accommodate. That is, the chip manufacturers try to make a broad spectrum recommendation to cover all frequencies when only certain frequencies need to be covered with respect to impedance. Thus, this approach tends to yield data of limited value for the printed circuit board manufacturers.

Accordingly, there is a need to provide a tool for chip manufacturers and printed circuit board manufacturers to better understand the dynamic current waveform for a chip to be placed on a printed circuit board.

SUMMARY

Embodiments of the present invention provide a method and system for understanding the current waveforms for a chip to be placed on a printed circuit board. It should be appreciated that the present invention can be implemented in numerous ways, such as a process, an apparatus, a system, a device or a method on a computer readable medium. Several inventive embodiments of the present invention are described below.

In one aspect of the invention, a method for determining a current spectrum for a circuit design is provided. The method includes determining timing characteristics and power consumption characteristics for the circuit design. In one embodiment, the timing characteristics are provided through a electronic design automation tool (EDA), such as the QUARTUS™ tool of ALTERA CORPORATION. The timing characteristics yield a current pulse time width. In another embodiment, the power consumption characteristics are provided by an EDA tool, such as the QUARTUS™ tool of ALTERA CORPORATION. The power consumption characteristics yield a current pulse amplitude. The shape of the current pulse is obtained by incrementally processing a power analyzer tool over relatively small time increments over one or more clock cycles while capturing the switching nodes of a simulation of the circuit design for each time increment. In one embodiment, the time increments are one nanosecond or less. From the timing characteristics and the power consumption characteristics a time domain current waveform is constructed. The time domain current waveform is then converted to a frequency domain current waveform, e.g., through a Fast Fourier transform in one embodiment.

With the frequency domain waveform, one skilled in the art can then identify a location and an amount of decoupling capacitors for a printed circuit board housing the circuit design based on the frequency domain current waveform. In another embodiment, the method operations may be embodied onto a computer readable medium and stored onto a computing system. The computing system may then be used to analyze a circuit design as discussed below.

Other aspects of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

The embodiments described herein provide a method and apparatus for predicting current spectrums. It will be obvious, however, to one skilled in the art, that the present invention may be practiced without some or all of these specific details. In other instances, well known process operations have not been described in detail in order not to unnecessarily obscure the present invention.

The embodiments described below provide a tool that predicts a current spectrum so that an optimal power distribution network (PDN) may be associated with the current spectrum. In one embodiment, a timing analyzer tool will provide the timing associated with the particular design as one input into the embodiments described below. A power consumption value is also provided as input and the power consumption may be provided through any number of tools which predict the total current being drawn by the chip design. This information is then processed as described in more detail below in order to provide a waveform of noise so that this waveform can be combined with the transfer impedance in order to enable a printed circuit board manufacturer to accurately determine where and how many decoupling capacitors to place on the printed circuit board for the chip design. In an alternative embodiment, an incremental algorithm is used to more accurately generate a shape of the current in a path. The incremental algorithm forces a power consumption tool to calculate power characteristics at incremental time partitions to accurately represent a current amplitude as opposed to providing an average current over a large time period.

Figure 1:
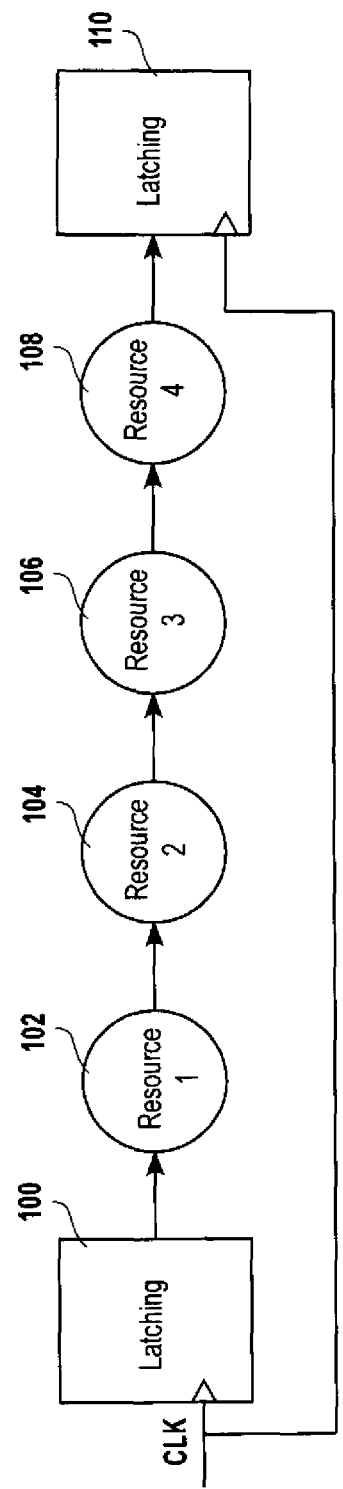
FIG. 1 is a simplified schematic diagram illustrating the timing aspects associated with a pathway within one aspect of an integrated circuit in accordance with one embodiment of the invention.

FIG. 1 is a simplified schematic diagram illustrating the timing aspects associated with a pathway within one aspect of an integrated circuit in accordance with one embodiment of the invention. Launching register 100 communicates with latching register 110 through a path traversing a number of resources. In particular, launching register 100 provides an output to resource 1 102, which is in communication with resource 2 104. Resource 2 104 in turn provides output to resource 3 106. Resource 3 106 provides output to resource 4 108 which subsequently provides output to latching register 110. A clock signal is provided to launching flip flop 100 and latching register 110. The timing aspects must be considered in order to ensure that data at latching register 110 is stable by the time the next clock edge arrives. Resources 1 through 4, 102 through 108, represent any logic that manipulates data in order to provide an output to latching register 110. In one embodiment, the logic may be any logic currently utilized by programmable logic devices (PLDs), such as the PLDs provided by the assignee. It should be appreciated that with each of the resources 102 through 108 there is a time associated with the processing. For example, resource 1 may have a processing time of 100 picoseconds, resource 2 200 picoseconds, resource 3 300 picoseconds, resource 4 100 picoseconds, while latching register may require a 100 picoseconds setup time in order to ensure that the data is stable. Thus, adding up each of these times provides 800 picoseconds of time. The clock cycle is one nanosecond in this exemplary situation. As will be explained in more detail below, the 800 picoseconds fly time calculated above will become a time width of the current waveform as determined by the embodiments below in one exemplary situation.

Figure 2:
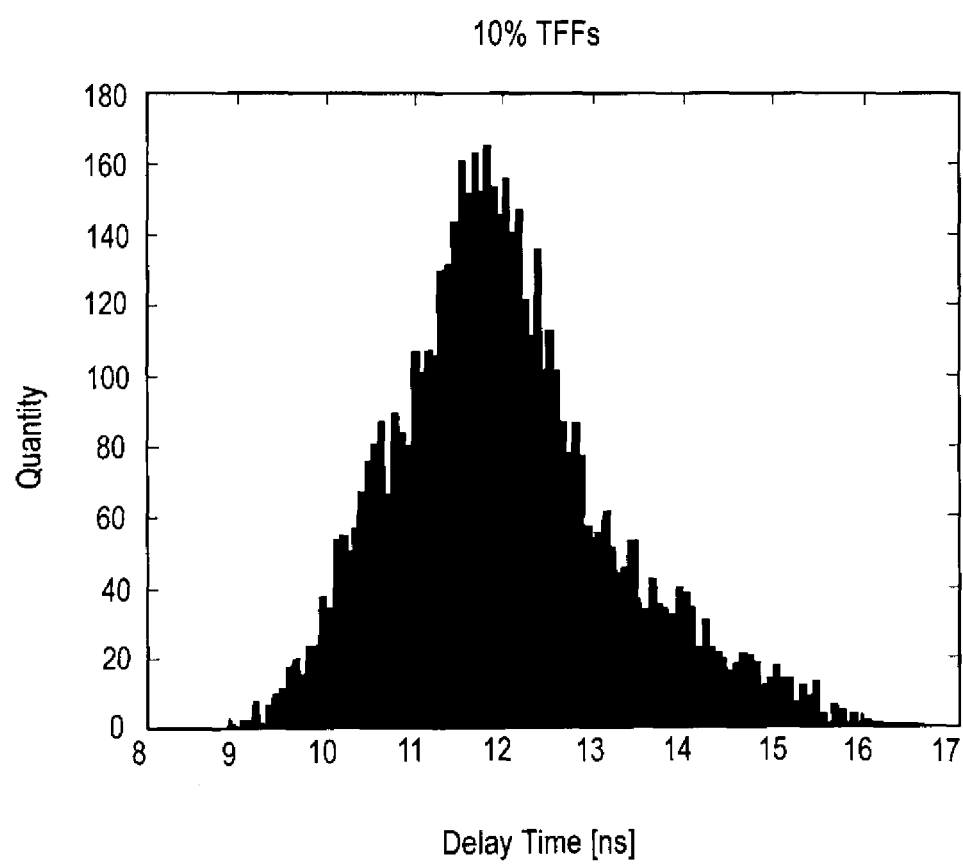
FIG. 2 is a graphical illustration of the path delay distribution extracted from a timing analysis in accordance with one embodiment of the invention.

FIG. 2 is a graphical illustration of the path delay distribution extracted from a timing analysis in accordance with one embodiment of the invention. The x axis of FIG. 2 represents a delay time in nano seconds, while the y axis represents a number of toggle flip flops (TFF) that are switching. One skilled in the art will appreciate that common circuit design analysis tools produce path by path analysis of the propagation through each logical path of the design. Each of these paths has a start time and end time, and from this information a circuit activity distribution may be reconstructed as illustrated in FIG. 2. Accordingly, FIG. 2 represents the delay distribution for a group of toggle flip flops extracted in one exemplary embodiment and is not meant to be limiting as the path delay distribution is dependent on the circuit design.

Figure 3:
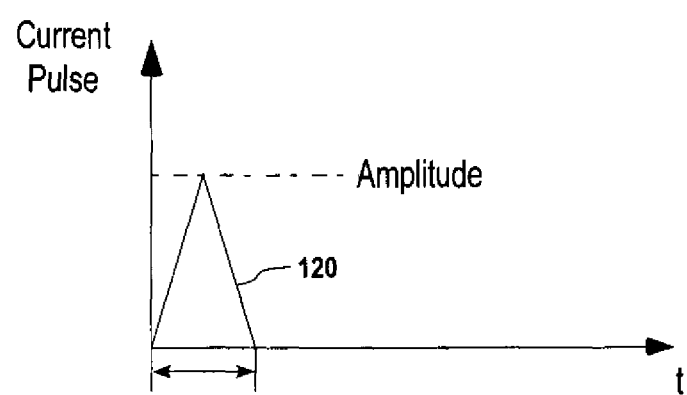
FIG. 3 is a simplified schematic diagram illustrating an assumed current shape for each path in the circuit design in accordance with one embodiment of the invention.

FIG. 3 is a simplified schematic diagram illustrating an assumed current shape for each path in the circuit design in accordance with one embodiment of the invention. Under current power consumption analyses, the switching activity current is estimated for a circuit design. In one embodiment, the analysis estimates a certain amount of current drawn by a circuit each time the logic of the circuit switches. In one embodiment, one such tool available for providing this estimate is the POWER PLAY™ tool available from the assignee. However, other suitable tools may be used to estimate the current drawn by each path. As explained further below, an alternative embodiment utilizes an incremental algorithm to provide the current over small discrete time intervals to provide a more detailed representation of the current waveform.

In FIG. 3, a triangular shape 120 has been provided in this embodiment. Triangular shape 120 for the assumed current shape has an amplitude and a time width. Referring back to FIG. 1, assuming that the exemplary path of FIG. 1 is being used, the time width on the x axis of FIG. 3 would represent the 800 picoseconds referred to in FIG. 1. One skilled in the art will appreciate that since there is a time delay associated with the signal processing through a path, the current shape will not be a simple instantaneous pulse. It should be noted that for the analysis provided herein, it is assumed that each TFF draws the same amount of current. The amplitude of the current drawn is represented on the y axis. Thus, triangular shape 120 captures both the time and amount of current through the logical pathway. It should be further noted that with reference to FIG. 2, each data point may be represented as a triangular shape illustrated in FIG. 3 in order to provide the cumulative representation to yield the agglomerated distribution of FIG. 2.

Figure 4:
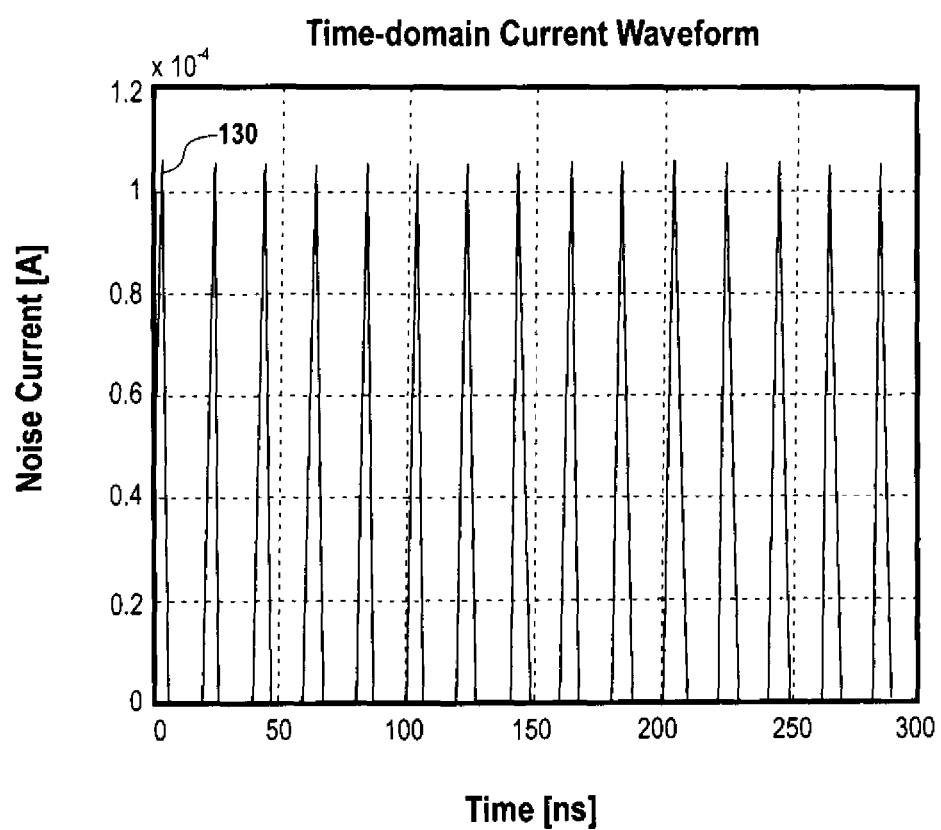
FIG. 4 is a reconstructed dynamic current waveform for the toggle flip flops described herein in accordance with one embodiment of the invention.
Figure 5:
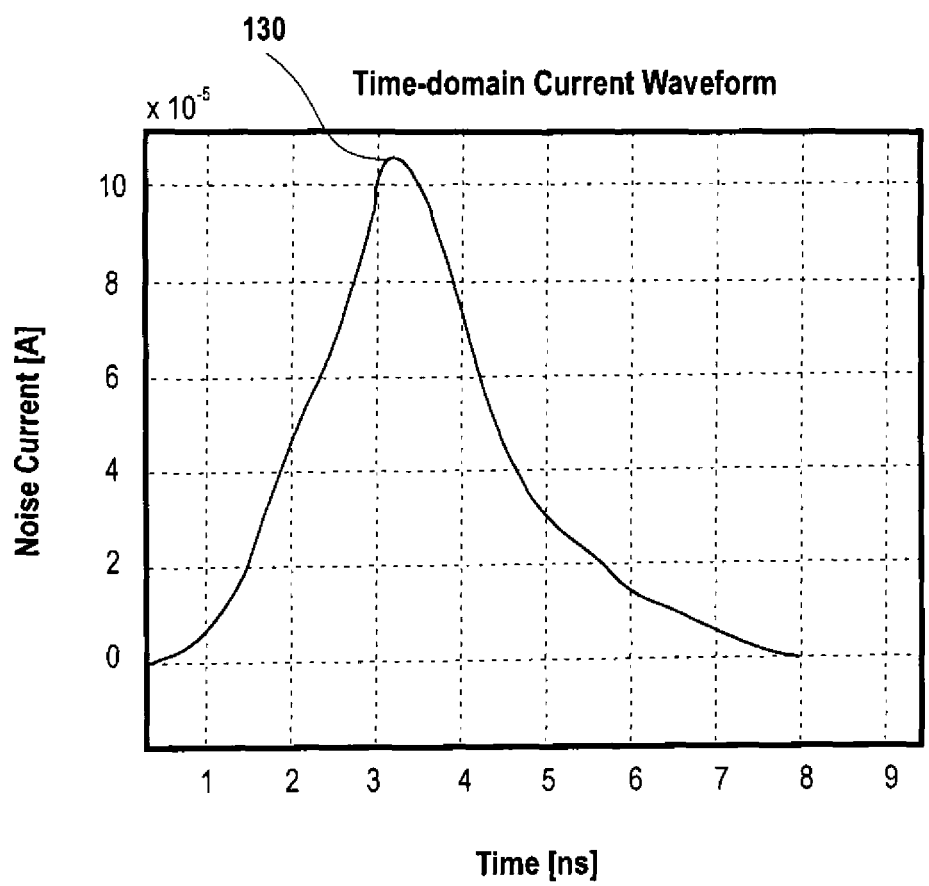
FIG. 5 is a simplified graphical representation which zooms in on peak 130 of FIG. 4.

FIG. 4 is a reconstructed dynamic current waveform for the toggle flip flops described herein in accordance with one embodiment of the invention. In FIG. 4, peak 130 occurs at each clock cycle as illustrated in the graph where time is represented on the x axis in nanoseconds and noise current in amps is represented in the y axis. FIG. 5 is a simplified graphical representation which zooms in on peak 130 of FIG. 4. FIGS. 3 through 5 provide waveforms in the time domain. In order to make use of these waveforms for PDN design and power fluctuation analysis, the time domain waveform is converted to the frequency domain using standard techniques, e.g., Fourier transform. One skilled in the art will appreciate that cycles per second and the coulombs per second may be used to determine the coulombs per cycle in order to assist with the generation of FIG. 4.

Figure 6:
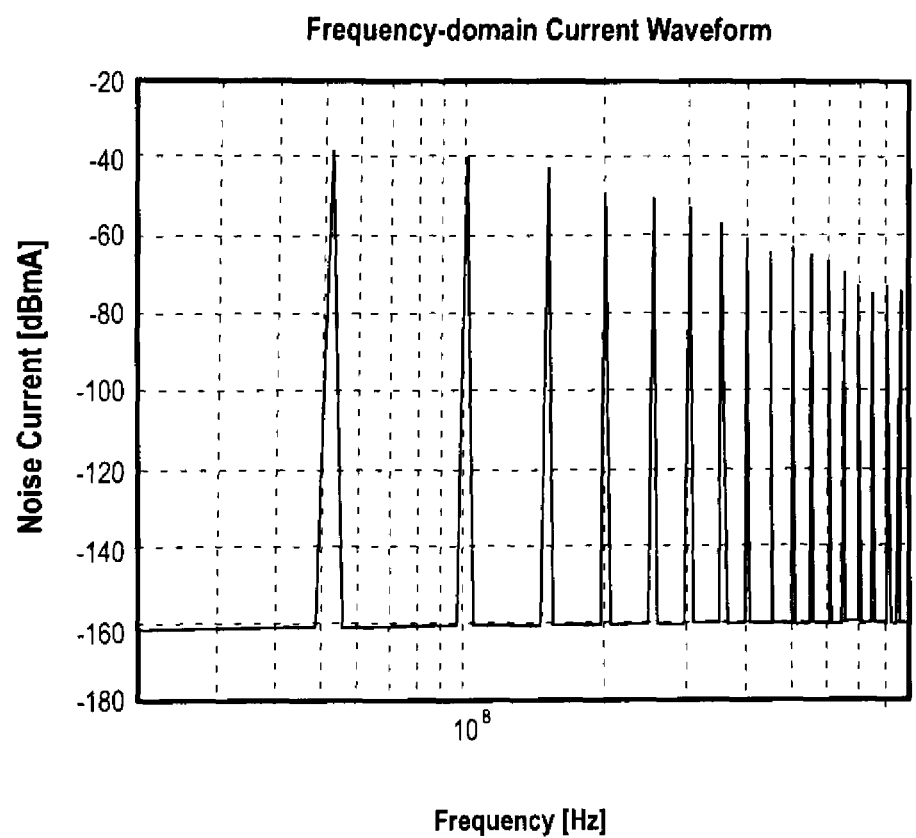
FIG. 6 is a graphical representation of the reconstructed dynamic current waveform for the toggle flip flops in the frequency domain in accordance with one embodiment of the invention.

FIG. 6 is a graphical representation of the reconstructed dynamic current waveform for the toggle flip flops in the frequency domain in accordance with one embodiment of the invention. In FIG. 6, the time domain represented in FIG. 4 is converted to the frequency domain where the frequency is represented on the x axis and the noise current on the y axis. The spectrum represented in FIG. 6 is then converted to a power spectrum through the use of the formulas supplied below.

$$V = Iest \times Z21$$
$$Pest = \frac{V^2}{Z22}$$

Figure 7:
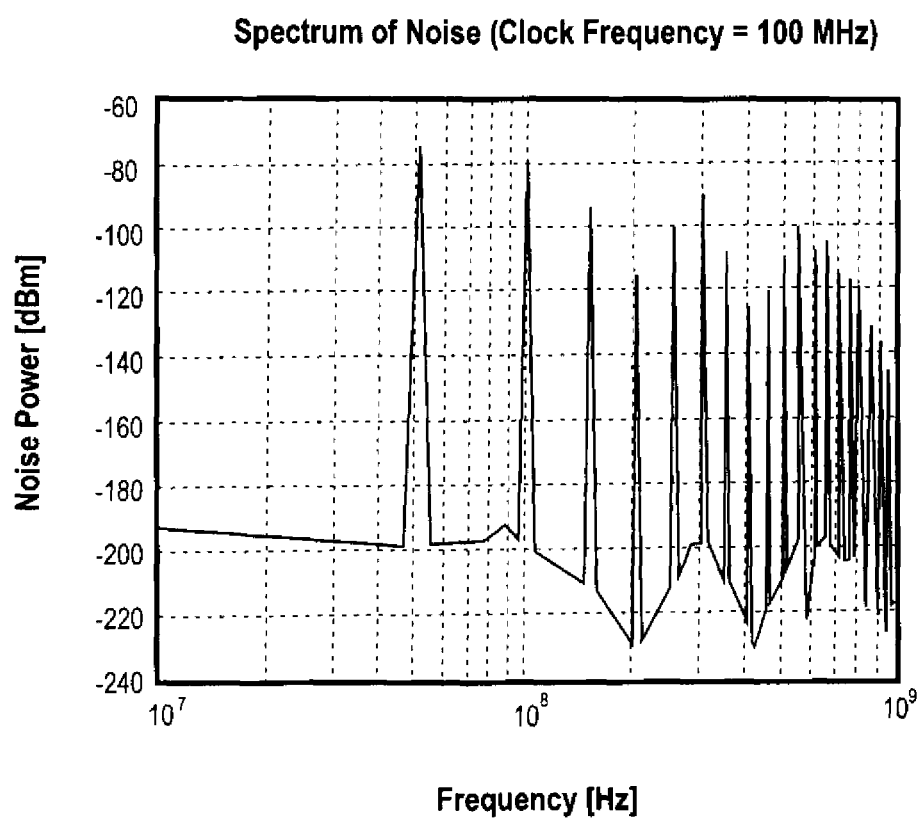
FIG. 7 represents the resulting power spectrum when the calculations performed through the above equations are applied to FIG. 6.

In the above formulas, Iest is the estimated current illustrated in FIG. 6, P is the estimated power of FIG. 7, V is the voltage, and Z21 and Z22 represent the impedance of a test board.

FIG. 7 represents the resulting power spectrum when the calculations performed through the above equations are applied to FIG. 6. One skilled in the art will appreciate that the resulting power spectrum of FIG. 7 may be used to predict voltage fluctuations and inform a circuit designer how to improve the PDN design through standard techniques.

Figure 8:
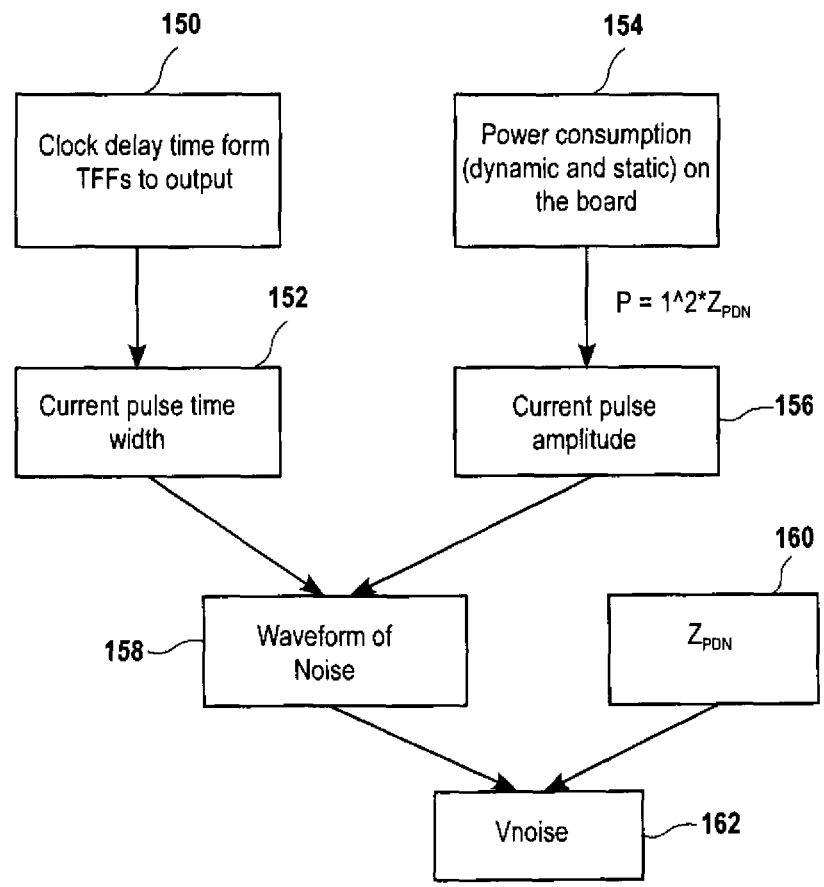
FIG. 8 is a simplified flow chart diagram illustrating method operations for predicting a dynamic current waveform in accordance with one embodiment of the invention.

FIG. 8 is a simplified flow chart diagram illustrating method operations for predicting a dynamic current waveform in accordance with one embodiment of the invention. In operation 150, the clock delay time from toggle flip flops to output for logical path is determined. For example, the logical path may be the logical path represented by FIG. 1. As discussed above, any synthesis tool may provide this data. In one exemplary embodiment, the clock delay time from the TFF's to an output is supplied through the QUARTUS™ timing analyzer of the assignee. From the information gathered from operation 150, a current pulse time width is determined. For example, the current pulse time width of FIG. 3 may be determined here, in one embodiment. In operation 154 power consumption which includes both dynamic and static power consumption on a board is determined. As discussed above, the power consumption may be determined through a suitable commercially available tool such as the POWER PLAY™ tool available from the assignee. Further information of the POWER PLAY™ tool and the QUARTUS™ design software are available at the assignees website and incorporated herein by reference. In such a tool, the tool will look at the resources and each resource is assigned a current value. The tool will then assume at any given time a certain percentage of these resources may switch in order to determine a dynamic current value. For example, the tool may determine that the design will draw four amps total of which three amps are static current and one amp is the dynamic current. From this data, a current pulse amplitude is determined in operation 156. Thus, with the current pulse amplitude and the current pulse time width, a shape may be assigned to the current waveform as described above with regards to FIGS. 3 through 5. The waveform of noise is then generated in operation 158. Exemplary waveforms of noise has been illustrated in FIGS. 4 through 7. Combining the waveforms of noise in operation 158 with the transfer impedance determined in operation 160, will provide the spectrum of noise in operation 162. The transfer impedance may be determined through any commercially available configured to extract the impedance of a test board. As mentioned above, the reconstructed dynamic current waveform in the frequency domain of FIG. 6 may be converted to the waveform of FIG. 7 through the application of the formulas which take into account the impedance of a test board. In one embodiment, the impedance of the test board may be determined through a POWER PLANE™ analysis tool configured to extract this impedance.

Figure 9:
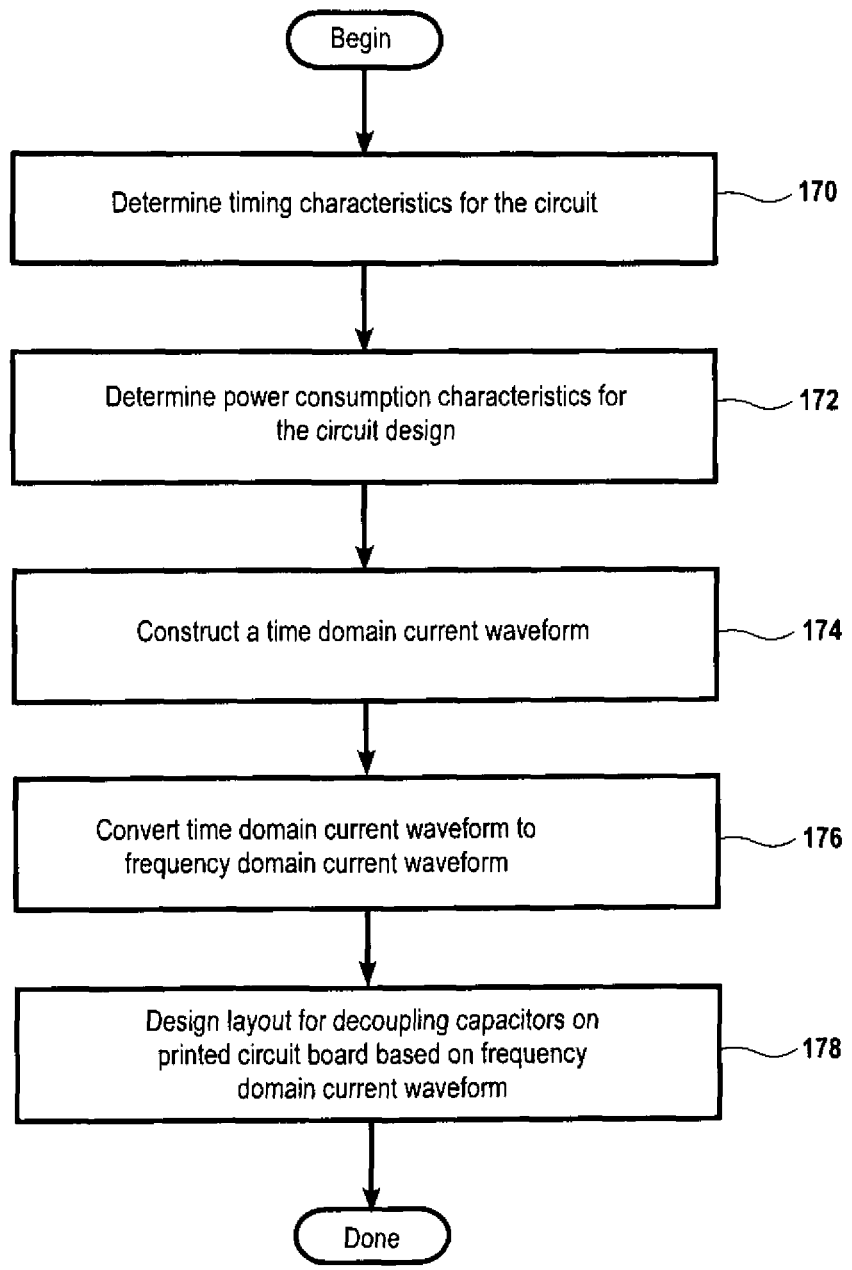
FIG. 9 is a flow chart diagram illustrating the method operations for determining a current spectrum for a circuit design in accordance with one embodiment of the invention.

FIG. 9 is a flow chart diagram illustrating the method operations for determining a current spectrum for a circuit design in accordance with one embodiment of the invention. The flow chart initiates with method operation 170 where timing characteristics for a circuit design are determined. In operation 170 the timing component is provided for a logical path thereby giving a width of a waveform as described above with regard to FIG. 3. The method then advances to operation 172 where the power consumption characteristics for the circuit design are determined. Here, the dynamic and static power consumption may be determined through a suitable tool which will provide the amplitude for the current as described above with regard to FIG. 3. In the embodiment described later, an incremental technique is applied to gather more accurate information on the current waveform. In this embodiment, the time interval is subdivided into small portions, e.g., 1 nanosecond or less, and the current amplitude is calculated. The method then proceeds to operation 174 where a time domain current waveform is constructed from the data provided by operations 170 and 172. For example, the time domain waveform represented by FIG. 4 may be constructed from the data captured above. The time domain waveform is then converted to a frequency domain through a transform function such as a fast Fourier transform (FFT) in operation 176. In combination with the transfer impedance, the power spectrum for a printed circuit board may be generated so that a designer can determine where to place and an optimum amount of capacitors on the printed circuit board in operation 178.

Figure 10:
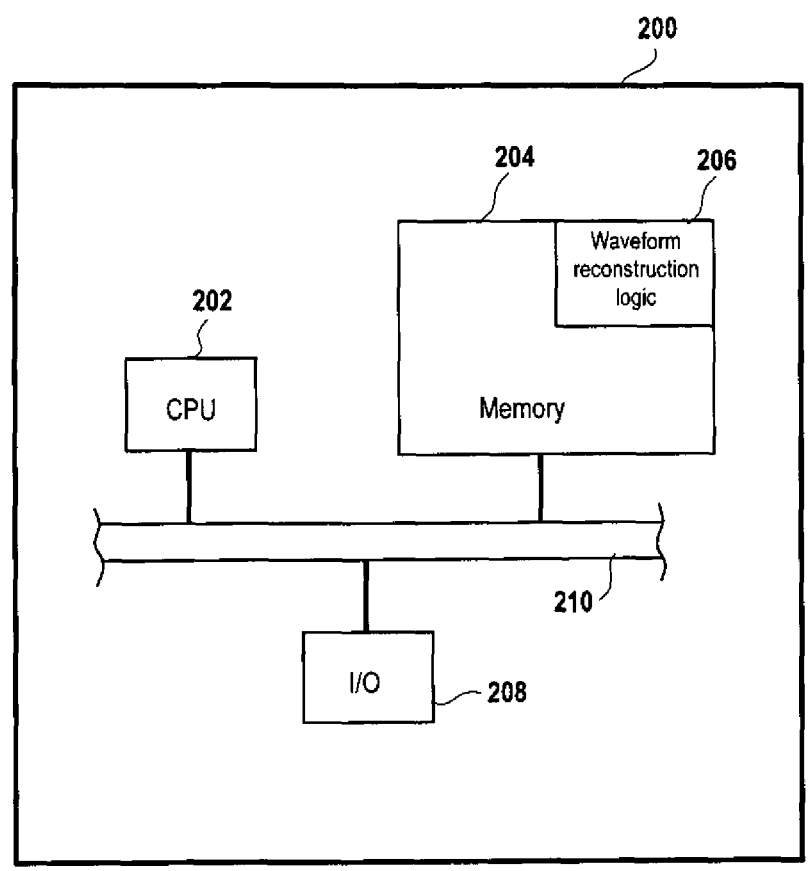
FIG. 10 is a simplified schematic diagram illustrating a system which is capable of determining a dynamic current waveform in accordance with one embodiment of the invention.

FIG. 10 is a simplified schematic diagram illustrating a system which is capable of determining a dynamic current waveform in accordance with one embodiment of the invention. System 200 includes central processing unit (CPU) 202, memory 204, and input/output (I/O) block 208. CPU 202, memory 204, and I/O block 208 are in communication with each other over bus 210. Memory 204 includes waveform reconstruction logic 206. Waveform reconstruction logic 206 is configured to execute the functionality described above with regards to FIGS. 1 through 9 and the alternative embodiment of FIGS. 11-13B. Thus, the waveform reconstruction logic 206 will determine a dynamic current waveform from clock delay time provided through one tool and power consumption provided through another tool in accordance with one embodiment of the invention. In addition, the waveform reconstruction logic 206 will consider the transfer impedance in providing data to a circuit designer so that the circuit designer may optimally place decoupling capacitors on a circuit board for smooth operation with a corresponding chip. Of course, the waveform reconstruction logic may be a module integrated into a synthesis or place and route tool, such as the QUARTUS™ tool available from the assignee. In one embodiment, the wave form reconstruction logic includes the incremental algorithm discussed in further detail below.

Figure 11:
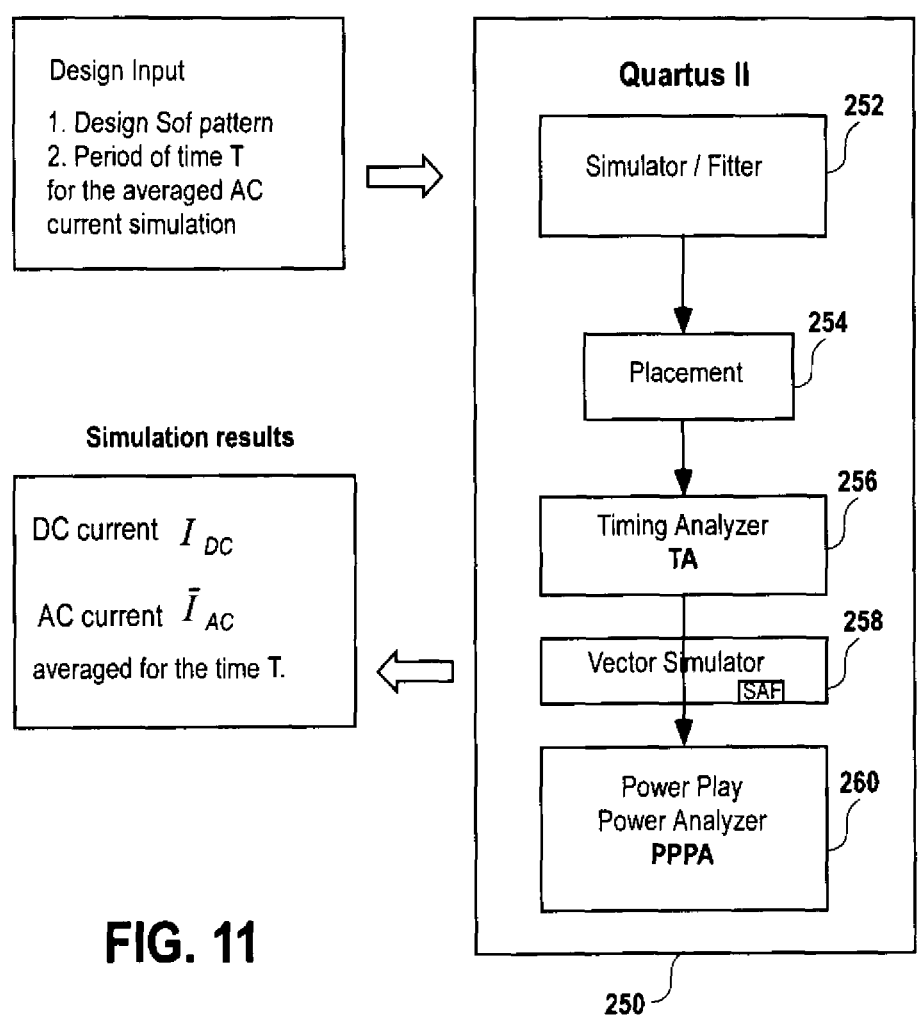
FIG. 11 is a simplified schematic diagram providing an overview of embodiments described up to this point for predicting current spectrum for a power distribution network by a current averaged for a relatively large time period in accordance with one embodiment of the invention.

FIG. 11 is a simplified schematic diagram providing an overview of embodiments described up to this point for predicting current spectrum for a power distribution network by a current averaged for a relatively large time period in accordance with one embodiment of the invention. In another embodiment, the dynamic current waveform and dynamic current spectrum are calculated through an incremental algorithm which forces the power play power analyzer to increment for small time intervals in order to provide a more detailed analysis as discussed with reference to FIGS. 12-13B. In FIG. 11, electronic design automation module 250 includes simulator/fitter 252. A design input is provided to simulator/fitter 252. The placement of the components within the design input is provided as an output from fitter 252 and is represented by placement module 254. In one embodiment, where the QUARTUS™ electronic design automation software of the assignee is used, the placement module 254 may output an Sof file. The output from placement module 254 is provided to timing analyzer 256. Timing analyzer 256 will verify correct timing for the placement of the components. Timing analyzer 256 then outputs vectors to vector simulator 258. Vector simulator 258 will manipulate the data in form signal activity files (SAF) as indicated in module 258. Power play analyzer 260 will then simulate the DC and averaged AC consumption current by using the results of the timing simulation provided by timing analyzer 256. The simulated AC current is an averaged current for the time interval T. Time interval T may be specified by a designer in one embodiment. Under the embodiments described above, this time interval includes many cycles of the device. The power play power analyzer also provides the information about averaged current consumption for each component or different level of design hierarchy for the period of time specified. While this information is very useful, it does not provide the information about the current spectrum or current wave form. A further improvement in order to get information on the current spectrum or current waveform is provided through an incremental algorithm utilized in the system as described below.

Figure 12:
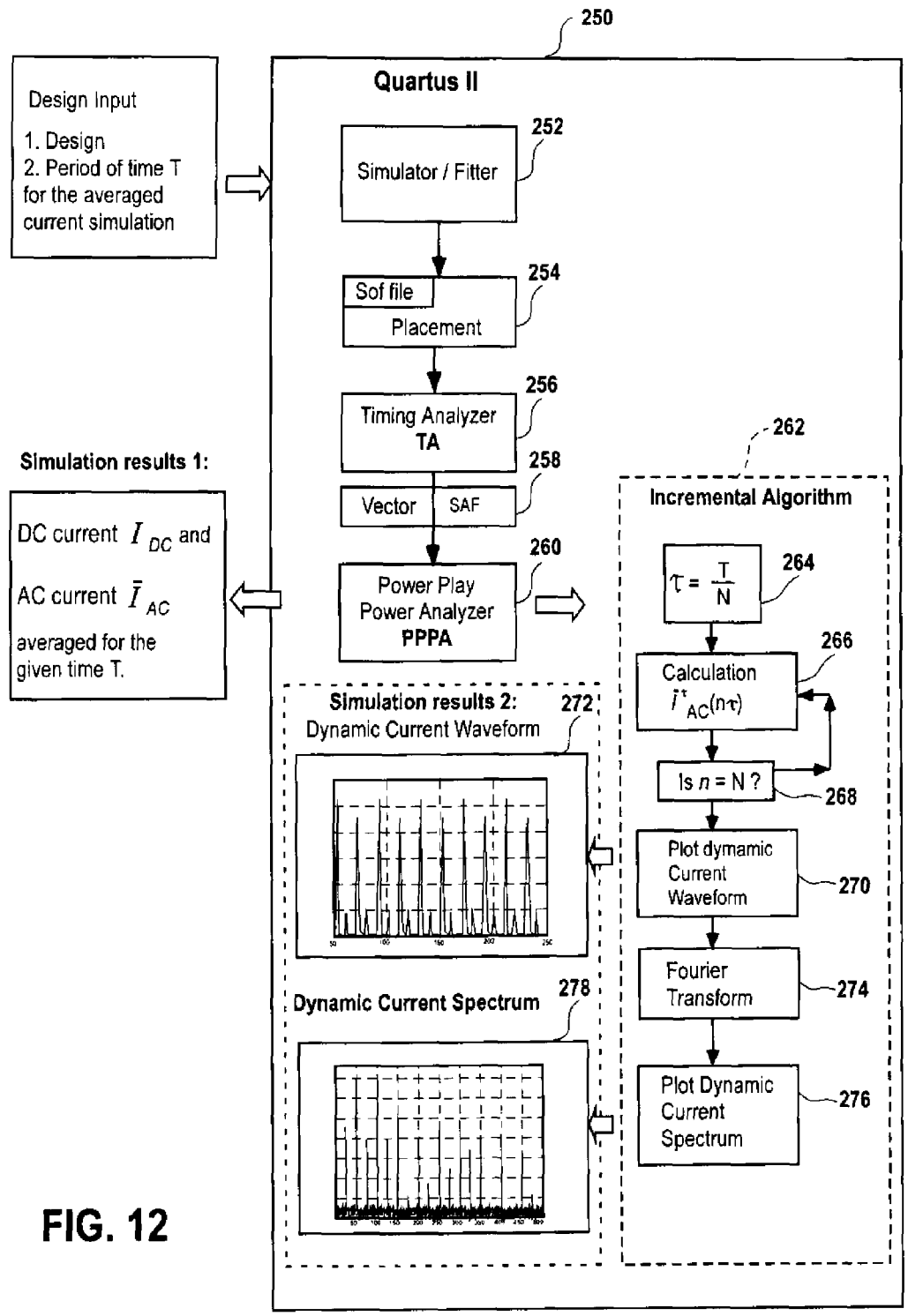
FIG. 12 is a simplified schematic diagram illustrating an improved technique for the system of FIG. 11 through the employment of an incremental algorithm in accordance with one embodiment of the invention.

FIG. 12 is a simplified schematic diagram illustrating an improved technique for the system of FIG. 11 through the employment of an incremental algorithm in accordance with one embodiment of the invention. System 250 includes simulator 252, placement module 254, timing analyzer 256, vector module 258 and power analyzer 260. For the sake of brevity, the modules having the same functionality described above are not repeated as these modules have been described with reference to FIG. 11. As described with reference to FIG. 11, the power analyzer 260 will output an AC current averaged for a given time period. As mentioned above, the time period is relatively large and includes many clock cycles. Alternatively, an incremental algorithm may be used as illustrated in module 262 in order to provide a dynamic current wave form and dynamic current spectrum.

Under the incremental algorithm of module 262, the power analyzer 260 will calculate a small time interval t which is equal to T/N where N is a number of intervals of t. In one embodiment, this interval can be as small as 1 nanosecond or even less. Thus, the time period T is segmented into a number of portions or time partitions. Under the incremental algorithm, the power analyzer 260 calculates the average dynamic current for each time interval t in module 266. This current is recorded and distributed among the nodes being switched for that time period, which is available through the signal activity file from vector module 258. The calculation repeats until the number of intervals n reaches N. When the number of intervals n is equal to N in module 268, the power analyzer plots the dynamic current wave form as specified in module 270. An exemplary plot of the dynamic current wave is illustrated in graph 272. A Fourier transform is applied in module 274 in order to transform the dynamic current wave form to a dynamic current spectrum. The dynamic current spectrum is plotted in module 276 and an exemplary dynamic current spectrum is provided in graphical form in graph 278. It should be appreciated that the dynamic waveform generated through the incremental calculation of $I_{AC}$ eliminates the need to assume a current shape as discussed with reference to FIG. 3.

Figures 13A, 13B:
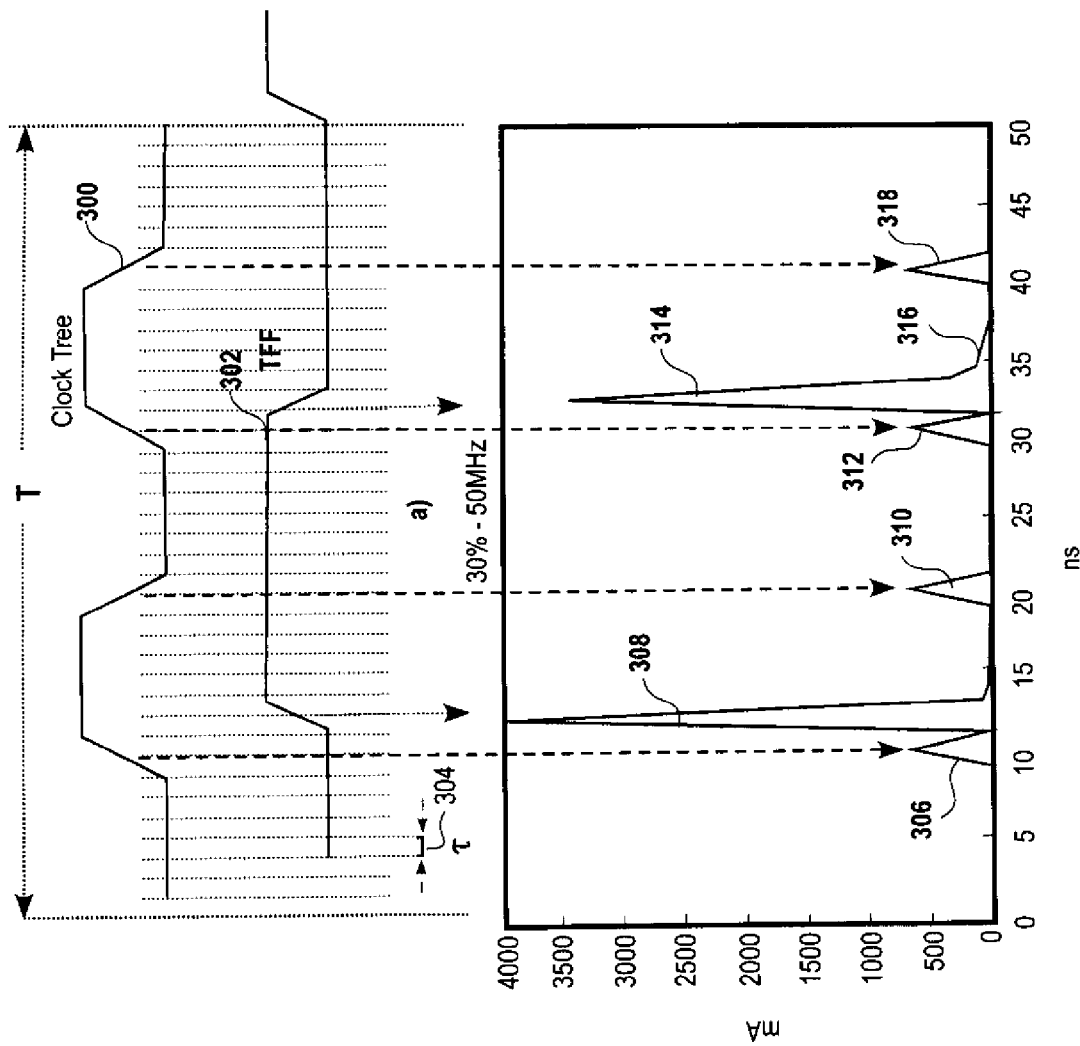
FIG. 13A is a sample wave form for a clock tree and toggle flip flops of a circuit design for one exemplary application of the incremental algorithm in accordance with one embodiment of the invention.
FIG. 13B is an exemplary dynamic current waveform derived from the waveform of FIG. 13A in accordance with one embodiment of the invention.

FIG. 13A is a sample wave form for a clock tree and toggle flip flops of a circuit design for one exemplary application of the incremental algorithm in accordance with one embodiment of the invention. In FIG. 13A, clock tree wave form 300 is shown having a period T. Wave form 302 provides the switching for toggle flip flops of a design over a time period in accordance with one embodiment of the invention. As illustrated, t time periods are provided such that T is subdivided in numerous smaller time periods of duration t. It should be appreciated that t time periods 304 can be any suitable time period that will accurately capture the data for the dynamic wave form of FIG. 13B. Applying the incremental algorithm described above to the design and forcing the calculation of the current over each incremental time period will provide the dynamic current wave form from the wave forms of FIG. 13A.

In FIG. 13B, peak 306 corresponds to the rising edge of clock tree wave form 300, peak 308 corresponds to the rising edge or the triggering of the toggle flip flops in wave form 302, peak 310 corresponds to the falling edge of clock tree wave form 300, and peak 312 corresponds to the rising edge of a second pulse of clock tree wave form 300. Peak 314 corresponds to the falling edge of toggle flip flop wave form 302, and peak 318 corresponds to the falling edge of the second pulse of clock tree wave form 310. It should be appreciated that peak 314 has a larger area defined in region 316 due to the nature of the toggle flip flops and corresponding pass gates in accordance with one embodiment. For example, where the pass gates are an PMOS pass gate, the processing of a logical high signal to a logical low signal provides a different response than the processing of a logical low signal to a logical high signal. More specifically, the transition from a logical high signal to a logical low signal does not occur as fast as the transition from a logical low signal to a logical high signal. This artifact is captured through the embodiments described herein and illustrates the power of the incremental algorithm and the available data that this technique can generate.

The embodiments, thus far, were described with respect to PLDs. The method and apparatus for in-system programmability, described herein may be incorporated into any suitable circuit. For example, the method and apparatus may be incorporated into other types of devices such as a programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be the an of the family of devices owned by the assignee.

Any of the operations described herein that form part of the invention are useful machine operations. The invention also relates to a device or an apparatus for performing these operations. The apparatus can be specially constructed for the required purpose, or the apparatus can be a general-purpose computer selectively activated, implemented, or configured by a computer program stored in the computer. In particular, various general-purpose machines can be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for determining a current spectrum for a circuit design of an integrated circuit, said method comprising:
    determining power consumption characteristics for the circuit design of the integrated circuit over discrete increments of a time period;
    constructing a time domain current waveform based upon a path delay distribution from timing characteristics of the circuit design, and the power consumption characteristics;
    converting the time domain current waveform to a frequency domain current waveform; and
    identifying a location and an amount of decoupling capacitors for a printed circuit board housing the circuit design based on the frequency domain current waveform, wherein at least one method operation is executed through a processor;
    wherein the power consumption characteristics and the timing characteristics are provided by analysis of the circuit design with at least one engineering design automation tool.

2. The method of claim 1, further comprising:
    calculating an amplitude of a current for the circuit design at each of the discrete increments.

3. The method of claim 1, wherein constructing the time domain current waveform from the timing characteristics and the power consumption characteristics comprises:
    determining a current pulse time width for each of the discrete increments.

4. The method of claim 1, wherein determining power consumption characteristics for the circuit design comprises:
    determining dynamic power consumption and static power consumption for the circuit design, wherein the dynamic power consumption is based on a percentage of resources switching in the circuit design.

5. The method of claim 1, further comprising:
    calculating an impedance for the printed circuit board housing the circuit design.

6. The method of claim 5, further comprising:
    applying the calculated impedance to generate a spectrum of noise for the circuit design.

7. The method of claim 1, further comprising:
    generating a circuit having the circuit design; and
    placing the circuit on the printed circuit board, the printed circuit board having the amount of decoupling capacitors in the respective locations.

8. The method of claim 1, further comprising:
    modifying the circuit design;
    repeating the determining, the constructing, and the converting; and
    comparing time domain current waveforms.

9. A method for predicting transient currents in a circuit design of an integrated circuit, said method comprising:
    determining power consumption characteristics for the circuit design of the integrated circuit over discrete increments of a time period, wherein each discrete increment has a time period of one nanosecond or less;
    constructing a time domain current waveform based upon a path delay distribution extracted from timing characteristics of the circuit design, and the power consumption characteristics by determining a current pulse time width for each of the discrete increments;
    converting the time domain current waveform to a frequency domain current waveform; and
    identifying a location and an amount of decoupling capacitors for a printed circuit board housing the circuit design based on the frequency domain current waveform, wherein at least one method operation is executed through a processor;
    wherein the power consumption characteristics and the timing characteristics are from analysis of the circuit design, provided by at least one engineering design automation tool.

10. The method of claim 9, further comprising:
    calculating an amplitude of a current for the circuit design at each of the discrete increments.

11. The method of claim 9, wherein the converting is achieved through a Fast Fourier transform.

12. The method of claim 9 further comprising:
    calculating an impedance for the printed circuit board housing the circuit design.

13. The method of claim 12, further comprising:
    applying the calculated impedance to the circuit design to generate a noise spectrum for the circuit design when utilized with the printed circuit board.

14. A computer implemented system for designing circuits comprising:
    a bus;
    a memory; and
    a processor in communication with the memory through the bus, the processor operable to receive instructions from the memory which, when executed by the processor, cause the processor to perform a method comprising:
    determining power consumption characteristics for a circuit design of an integrated circuit over discrete increments of a time period;
    constructing a time domain current waveform based on a path delay distribution from timing characteristics of the circuit design, and the power consumption characteristics;
    converting the time domain current waveform to a frequency domain current waveform; and identifying a location and an amount of decoupling capacitors for a printed circuit board housing the circuit design based on the frequency domain current waveform;

wherein the power consumption characteristics and the timing characteristics are from analysis of the circuit design, with the analysis of the circuit design provided by at least one engineering design automation tool.

15. The computer implemented system of claim 14, further comprising:

calculating an amplitude of a current for the circuit design at each of the discrete increments.

16. The computer implemented system of claim 14, wherein constructing the time domain current waveform from the timing characteristics and the power consumption characteristics comprises:

determining a current pulse time width for each of the discrete increments.

17. The computer implemented system of claim 14, wherein determining power consumption characteristics for the circuit design comprises:

determining dynamic power consumption and static power consumption for the circuit design, the dynamic power consumption based on a percentage of resources switching in the circuit design.

18. The computer implemented system of claim 14, further comprising:

calculating an impedance for the printed circuit board housing the circuit design.

19. The computer implemented system of claim 14, further comprising:

generating a circuit having the circuit design; and placing the circuit on the printed circuit board, the printed circuit board having the amount of decoupling capacitors in the respective locations.

20. The computer implemented system of claim 14, further comprising;

modifying the circuit design;

repeating the determining, the constructing, and the converting; and comparing time domain current waveforms.

* * * * *